Patented May 3, 1949

2,468,916

UNITED STATES PATENT OFFICE 2,468,916

METHOD FOR PRODUCING ORGANIC TITANIUM COMPOUNDS

James Eliot Booge and Hugh Clifton Gulledge, Wilmington, Del., assignors to E. I. du Pont de Nemours & Company, Wilmington, Del., a corporation of Delaware No Drawing. Application February 23, 1946, Serial No. 649,758

7 Claims. (Cl. 260—429)

This invention relates to organic compounds of titanium and more particularly to the production of titanium containing derivatives of glycerin.

Metallo-organic compounds containing titanium are known and research along this line has produced considerable information regarding the esters of titanic acid. Specifically, compounds such as tetra-ethyl titanate are known and such a compound may be prepared by the reaction of titanium tetrachloride with sodium ethylate. The reaction between titanium tetrachloride and absolute alcohol does not give the tetra-ethylate, while a similar reaction using silicon tetrachloride gives the ethyl-orthosilicate. Only three of the four atoms in titanium tetrachloride react with absolute alcohol and the resulting product is of acidic nature. The chlorine atom of the resulting complex compound may be removed by reaction with sodium ethylate and the ethyl-orthotitanate compound may thus be produced. This organic orthotitanate, which is sometimes referred to as ethyl titanate, has been found to be reactive with the less volatile alcohols such as glycerin, allyl and methallyl alcohols giving esters of orthotitanic acid which are less volatile than the tetraethyl ester.

The objects of this invention include the preparation of novel glycerin titanium compounds by use of inexpensive reactants. A further object is the preparation of compounds of glycerin and titanium through the esterification of titanic acid by a digestion operation. A still further object is the preparation of metallo-organic compounds of titanium of controlled solubility characteristics and specifically the production of water-soluble glycerol titanate of high purity.

These and other objects are accomplished by the following invention which embodies the discovery that orthotitanic acid may be reacted with glycerin by heat treating a suspension of orthotitanic acid in glycerin, the heat treatment being continued until water is evaporated from the suspension and until the solid phase has disappeared, at which time reaction is complete.

Orthotitanic acid is readily prepared from a titanium salt solution by neutralization of the same with an alkaline reagent. As an example, a solution of sodium carbonate may be added to a solution of titanium sulphate and as the neutral point is reached, a precipitate of orthotitanic acid will be present. This orthotitanic acid is readily purified by a washing treatment to remove sodium sulphate solution and a filter cake thus prepared will contain about 10% $TiO_2$, the remainder being water in either the combined or uncombined state. Such orthotitanic acid is available for use in our process, but it is understood that its method of preparation is not critical to the invention. It is obvious that other titanium salts or compounds may be used and other alkalies or neutralizing agents may be used in this preparation.

Orthotitanic acid on drying, is converted to titanium oxygen compounds having less combined water and when heated to a high temperature will contain no water of hydration. It is then usually designated as titanium dioxide. These dehydrated products are not suited for use in my process, due to their non-reactive character and accordingly, we prefer to use the freshly prepared orthotitanic acid in the production of the novel metallo-organic compounds of this invention.

A preferred embodiment of this invention comprises the admixing of orthotitanic acid filter cake and glycerin to thereby prepare a suspension of the orthotitanic acid in glycerin. Since both of these materials are usually prepared under neutral conditions, the pH of this suspension will be approximately 7, although it will obviously depend on the pH of the reagents used. Adjustment of pH at this point is readily accomplished by the addition of either an acid or an alkaline reagent and we have found that the characteristics of the final product will depend upon the pH during the heat treatment step, which is to be conducted later. A pH of not less than about 7 and not greater than about 10, will give a product which is water-soluble or miscible with water in all proportions. An entirely different product is obtained when we adjust the pH of the suspension through the addition of an acid reacting substance. The final product under these conditions is no longer water-soluble and has quite different properties from the alkaline digested metallo-organic compound. When operating on the acid side, the pH may be adjusted to not less than about 3, due to the tendency of inorganic compounds of titanium to be formed and the resulting inability to obtain a complete reaction between the glycerin and the orthotitanic acid.

The following examples are presented as a further disclosure of specific modes of operation of the invention.

Example I

A titanium sulphate solution analyzing 100 g./l. $TiO_2$ and 500 g./l. $H_2SO_4$ was neutralized by addition of a 40 gram per liter NaOH solution.

The orthotitanic acid thus precipitated was filtered and the filter cake washed free of soluble salts with water. The wet cake analyzed 10% $TiO_2$. Ten parts by weight of this cake were thoroughly mixed with 3 parts by weight of C. P. glycerin (molar ratio of 1:2.6). The slurry was kept at atmospheric pressure, and a stream of nitrogen bubbled through it. It was heated to 110° C., with constant agitation. When excess water had been expelled (about 2 hours), .036 part by weight of anhydrous $Na_2CO_3$ were added, followed by an additional 3 parts by weight of glycerin. The temperature was then raised gradually. At 150° C. the mass became very thick, but as the reaction proceeded beyond this point, viscosity decreased. Finally, the mixture was held at 200° C. for 20 minutes. A clear, brown, viscous liquid resulted, which was very soluble in water. It analyzed 21.6% $TiO_2$.

A solid titanium-organic compound was prepared by adding 3 parts by weight of the above viscous product to 8 parts by weight of water. To a portion of this solution were added 2 volumes of a mixture containing 2 parts 95% ethanol and 1 part ethyl ether. An almost water white, non-crystalline, glass-like solid glycerol titanate precipitated which analyzed 65% $TiO_2$ and this was found to be very soluble in water.

Example II

Eight parts by weight of a filter cake of orthotitanic acid containing 10% $TiO_2$, as described in Example I, were suspended in 10 parts by weight of glycerin (molar ratio of 1:10.9). The suspension was heated to 110° C., to evaporate water, and at this point .03 part by weight of sodium carbonate was added to render the material alkaline. It was transferred to a vacuum distillation apparatus and a pressure of 10 mm. of mercury was maintained while heating was continued. The product became very viscous at 125° C., but this became less pronounced as the temperature increased to 150° C. After 20 minutes at this temperature, the solids of the suspension disappeared and a transparent product resulted. A small stream of nitrogen was passed into the liquid and heating continued to distill off the excess glycerin and this was continued until a very thick material resulted. Upon cooling, a light brown, glass-like, non-crystalline solid resulted and this was found to be water-soluble and contained 30% $TiO_2$ as determined by analysis.

Example III

A suspension of orthotitanic acid was made as in Example II, except that a smaller amount of glycerin was used (molar ratio of 1:5.4). The suspension was placed in an open vessel and heating was provided for the evaporation of water. A nitrogen stream was again passed through the suspension to aid in the evaporation and in the maintenance of a non-oxidizing atmosphere. During the heating process, one mol of sulphuric acid, as a dilute solution, was added for each 100 mols of titanium oxide, in order to render the suspension acidic. Heating was continued and thickening occurred at 150° C., only to thin again as the heating continued. At 200° C., the reactants became clear and homogeneous. While maintaining this temperature, a precipitate began to form and two hours later the entire mass was solid. Excess glycerin was removed by extraction with water and the white solid remaining was found to be water-insoluble and contained 40% $TiO_2$.

While the above examples show specific methods of carrying out this invention, it is to be understood that one may vary the proportions of the reagents as well as the temperature, pressure, etc., during the dissolution operation. A batch method for the mixing of the orthotitanic acid with glycerin is described above, but it is obvious that the two reagents may be continuously added to a slurry of the titanium compound in glycerin, accompanied by agitation. Additionally, we have showed the adjustment of the pH at a certain point in the process, but it is obvious that alkali may be added to either of the reagents before the preparation of the suspension or it may be added immediately after the suspension is prepared. Homogeneity is more readily accomplished when the pH adjustment reagent is added before the suspension becomes viscous and the product is more uniform if added before solubilization begins.

The ratio of the titanium compound to glycerin, may be varied within wide limits, but in any event, two mols of glycerin should be used for each mol of orthotitanic acid. The solubilization can be more readily accomplished when using four mols or more of glycerin per mol of orthotitanic acid and accordingly such an amount is preferred. Still larger amounts may be used without interfering with the operation and up to 12 mols of glycerin per mol of orthotitanic acid is regarded as useful in the invention. The excess glycerin acts as a diluent and for some purposes may be desirable, while for other uses of my product, it may be removed by precipitating the glycerol titanate product, while the excess glycerin remains in the solution and may be separated therefrom. It is also possible to distill the glycerin from the reaction product by using vacuum technique, but in most instances it is advisable to start with an amount of glycerin which will not be objectionable in the final product.

The use of orthotitanic acid results in a dilute suspension of the titanium compound in glycerin, due to the fact that orthotitanic acid filter cake contains large amounts of water. This must be removed before any substantial amount of reaction takes place and before solubilization is effected. The glycerin suspension is usually heated to the boiling point and the water removed by boiling either at atmospheric or subatmospheric pressure. The boiling temperature will gradually increase as the water is removed but temperatures in excess of about 200° C. should be avoided due to the production of dark products. We have found that the discoloration of the final product is influenced greatly by the temperature and accordingly, we prefer to keep the temperature below about 150° C. with or without the aid of a vacuum to remove water from the reacting mixture. The completion of the reaction is recognized by the disappearance of suspended solid matter at which time the mass becomes translucent or transparent. The viscosity of the mass reaches a maximum prior to completion of the reaction, but the product at the time it becomes transparent, is still quite viscous.

The solubilized viscous liquid may be used as such or a solid may be produced therefrom. The product resulting from the use of an alkaline suspension and the smaller amounts of glycerin relative to orthotitanic acid, may be transformed into a solid upon cooling. The product is water-soluble and may be used as a reagent to introduce titanium into organic compositions and as such may be referred to as a titanating agent.

Glycerin titanate in solid form, may also be produced from the viscous alkaline digested suspension, by the addition of an organic liquid such as an ethyl-alcohol, ethyl-ether, ethyl-acetate, acetone or other water-soluble organic reagents. The glycerol titanate is less soluble in the resulting liquids and accordingly separates as a solid. The solid product from the digestion of acidic suspension of orthotitanic acid and glycerin is most readily obtained by maintaining an elevated temperature after the titanic compound has dissolved completely in the glycerin and until solidification occurs. This is illustrated in Example III above, and excess glycerin may be extracted by simple water-treatment. The solid product may be ground to a powder and used as an ingredient in molding compositions for the purpose of modifying the properties of such compositions.

The use of an inert gas such as nitrogen during the preparation of the glycerol titanate is disclosed in the above examples and it serves to maintain a non-oxidizing atmosphere in contact with the heated glycerin composition. Oxidation of a portion of the organic compound is avoided and a more uniform product is thus obtained, but it is obvious that this condition may be met by other modes of operation. The nitrogen also serves to assist the removal of steam from the composition during the period when the suspension is becoming more concentrated. It is obvious that other inert gases including high temperature steam, may be used to maintain the non-oxidizing atmosphere when the latter is desired.

While orthotitanic acid and glycerin are mentioned above as starting materials, it is obvious that the orthotitanic acid may be prepared in situ through the use of a titanium salt and a neutralizing agent. This requirement may be met by combining a titanate salt such as sodium titanate, an acid and glycerin and choosing the right amount of the acid to give the desired pH to the combined material. The more attractive method is to combine a titanium salt such as titanium sulphate, a cheap alkali such as sodium carbonate, along with glycerin to give the desired composition. It is obvious, that after mixing the ingredients, as outlined, the whole is heated to effect combination of the titanium and the glycerin after which it may be cooled and used with or without the separation of the alkali salt that may be present therein. The latter may be removed as crystals from the composition with or without the use of a precipitant such as an organic solvent to reduce the solubility in the liquid.

We claim as our invention:

1. A process for producing a glycerin-titanium compound which comprises mixing precipitated, hydrated orthotitanic acid with glycerin to form a dilute suspension of said titanium compound in glycerin, and digesting the resulting suspension at an elevated temperature not in excess of 200° C. and until solubilization of said orthotitanic acid occurs.

2. A process for producing a glycerin-titanium compound which comprises mixing precipitated, hydrated orthotitanic acid with glycerin in a molar ratio ranging within 1:2 and 1:12, and then digesting said mixture at a temperature ranging from the boiling point to 200° C. and until solubilization of said orthotitanic acid takes place.

3. A process for the production of glycerin-titanium compounds which comprises heating a slurry mixture of hydrated orthotitanic acid and glycerin in which the ratio of orthotitanic acid to glycerin is within a range of from 1:2 to 1:12, to temperatures ranging from the boiling point to about 150° C. to effect removal of water by vaporization, and continuing said heating until solubilization of said orthotitanic acid becomes effected.

4. A process for the production of a glycerin-titanium compound which comprises digesting hydrated orthotitanic acid with glycerin in a suspension containing at least 4 mols of glycerin per mol of orthotitanic acid, by heating the slurry suspension of the reactants at a temperature above 100° C. and not to exceed 200° C., and continuing said heating with accompanying agitation of the mixture until solubilization of the orthotitanic acid occurs.

5. A process for the production of a water-soluble glycerin-titanium compound which comprises heating a slurry suspension having a pH of not less than 7 and not to exceed 10, of hydrated orthotitanic acid in glycerin, at temperatures ranging from 100° C. to 200° C., and continuing said heating until the suspended orthotitanic acid is solubilized.

6. A process for the production of a glycerin-titanium compound which is insoluble in water, comprising digesting at a temperature ranging from the boiling point to not to exceed 200° C., an acidic suspension of hydrated orthotitanic acid in glycerin, the pH of which suspension is not less than 3, continuing said digestion until said orthotitanic acid becomes solubilized and a clear solution forms, and continuing the heating of said clear solution to precipitate the insoluble glycerin-titanium compound.

7. A process for the production of a solid-water-soluble glycerin-titanium compound which comprises heating an alkaline suspension having a pH of from 7-10, of hydrated orthotitanic acid in glycerin, at a temperature above 100° C. and not to exceed 200° C., until the suspended orthotitanic acid is solubilized, and thereafter precipitating the resulting titanium compound by adding a water-soluble, organic liquid and recovering the resulting solid product.

JAMES ELIOT BOOGE.
HUGH CLIFTON GULLEDGE.

REFERENCES CITED

The following references are of record in the file of this patent:

UNITED STATES PATENTS

| Number | Name | Date |
| --- | --- | --- |
| 2,187,821 | Nelles | Jan. 23, 1940 |
| 2,258,718 | Rothrock | Oct. 14, 1941 |

FOREIGN PATENTS

| Number | Country | Date |
| --- | --- | --- |
| 54,576 | Norway | Nov. 5, 1934 |
| 136,009 | Germany | Oct. 23, 1902 |
| 479,470 | Great Britain | Feb. 7, 1938 |
| 709,041 | Germany | July 3, 1941 |

OTHER REFERENCES

Hancock, Jour. Oil Colour Chem. Assoc. 24 (1941), pages 293–308. (Copy in Dept. Agriculture Library.)